United States Patent
South et al.

(10) Patent No.: US 8,105,483 B2
(45) Date of Patent: Jan. 31, 2012

(54) SNAP-IN WATER SENSOR

(75) Inventors: Kevin C. South, Cookeville, TN (US); Charles W. Hawkins, Sparta, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 712 days.

(21) Appl. No.: 12/251,849

(22) Filed: Oct. 15, 2008

(65) Prior Publication Data

US 2010/0089805 A1   Apr. 15, 2010

(51) Int. Cl.
*B01D 35/14* (2006.01)
*B01D 35/00* (2006.01)

(52) U.S. Cl. ............. 210/86; 210/97; 210/103; 210/104

(58) Field of Classification Search .................. None
See application file for complete search history.

(56) References Cited

U.S. PATENT DOCUMENTS

| 3,181,098 | A | * | 4/1965 | Richards | .......................... 338/34 |
| 4,855,041 | A | * | 8/1989 | Church et al. | ................. 210/120 |
| 6,795,646 | B1 | | 9/2004 | Wieczorek et al. | |
| 2005/0167351 | A1 | * | 8/2005 | Herman et al. | ................ 210/209 |
| 2008/0308481 | A1 | * | 12/2008 | Wieczorek et al. | ........... 210/232 |
| 2009/0078631 | A1 | | 3/2009 | True-Dahl et al. | |

FOREIGN PATENT DOCUMENTS

| EP | 0289188 | 11/1988 |
| JP | 2003-293884 | 10/2003 |
| WO | 2007/054141 | 5/2007 |

OTHER PUBLICATIONS

International Search Report for corresponding application No. PCT/US2009/058207, dated May 3, 2010 (3 pages).
Written Opinion of the International Searching Authority for corresponding application No. PCT/US2009/058207, dated May 3, 2010 (5 pages).

* cited by examiner

*Primary Examiner* — Nam Nguyen
*Assistant Examiner* — Madeline Gonzalez
(74) *Attorney, Agent, or Firm* — Hamre, Schumann, Mueller & Larson, P.C.

(57) ABSTRACT

An improved water sensor and method for retaining a water sensor to a filter housing are described herein. A snap-fit connection is utilized to secure the water sensor to the filter housing. In one embodiment, the snap-fit connection is achieved using non-metallic components.

11 Claims, 6 Drawing Sheets

SNAP-IN WATER SENSOR

FIELD

This disclosure relates generally to fluid supply systems of vehicles, and particularly, but not by way of limitation, to filter assemblies that incorporate water sensors.

BACKGROUND

Certain engine fluid supply systems include a fluid filtration system designed to separate water from the fluid. An example of this type of engine fluid supply system is a fuel filter assembly that includes a filter housing and a water separating fuel filter element disposed therein. The fluid filtration system may also include a water sensor that extends through the filter housing into the interior thereof to detect if a certain amount of water has been collected in the filter housing. If enough water collects in the filter housing, a signal is sent to the user indicating that the water should be purged from the filter housing by, for example, opening a drain valve. The connection between the water sensor and the filter housing must be watertight to prevent water and fuel leakage. There is a constant need for improving the effectiveness of the retention of a water sensor to the filter housing.

SUMMARY

An improved water sensor and method for retaining a water sensor to a filter housing are described herein. A snap-fit connection is utilized to secure the water sensor to the filter housing. The use of a snap-fit connection facilitates assembly of the sensor and filter housing during manufacturing. Further, when the filter housing is made from molded plastic, threads are difficult to form where the sensor needs to be mounted, and spin welding to secure the sensor is not consistent. The use of a snap-fit connection provides the necessary connection between the sensor and plastic filter housing, while eliminating the need for traditional methods such as threads or spin welding to secure the sensor.

The water sensor and method will be described in an application involving retaining a water-in-fuel sensor to a fuel filter housing of a water separating fuel filter assembly. However, it is to be understood that the use of the snap-fit connection described herein is not limited to connecting a water-in-fuel sensor to a fuel filter housing. The snap-fit connection can be used to connect a water sensor to a filter housing in other engine fluid filtration systems.

In one embodiment, a filter assembly includes a filter housing having a wall defining an interior space and a water sump to collect water. A sensor mounting receptacle is formed in the filter housing adjacent the water sump and a first snap-fit connection member is formed on the sensor mounting receptacle. A water separating filter is disposable within the interior space of the filter housing to separate water from a fluid to be filtered by the filter. A water sensor is mounted within the sensor mounting receptacle and at least partially extends into the water sump for sensing water in the water sump. The water sensor includes a second snap-fit connection member that engages the first snap-fit connection member to secure the water sensor to the filter housing.

The water sensor mounted to the filter assembly includes a sensor body, a pair of spaced-apart water sensing probes connected to the sensor body, a snap-fit connection member on the sensor body adapted for use in a snap-fit connection, a sealing ring disposed on the sensor body, and an insertion stop mechanism formed on the sensor body. The insertion stop mechanism limits insertion of the sensor body into the sensor mounting receptacle, while providing the sealing ring on the sensor body facilitates molding of the sensor mounting receptacle when the receptacle is formed from molded plastic.

DRAWINGS

DETAILED DESCRIPTION

Figure 1A:
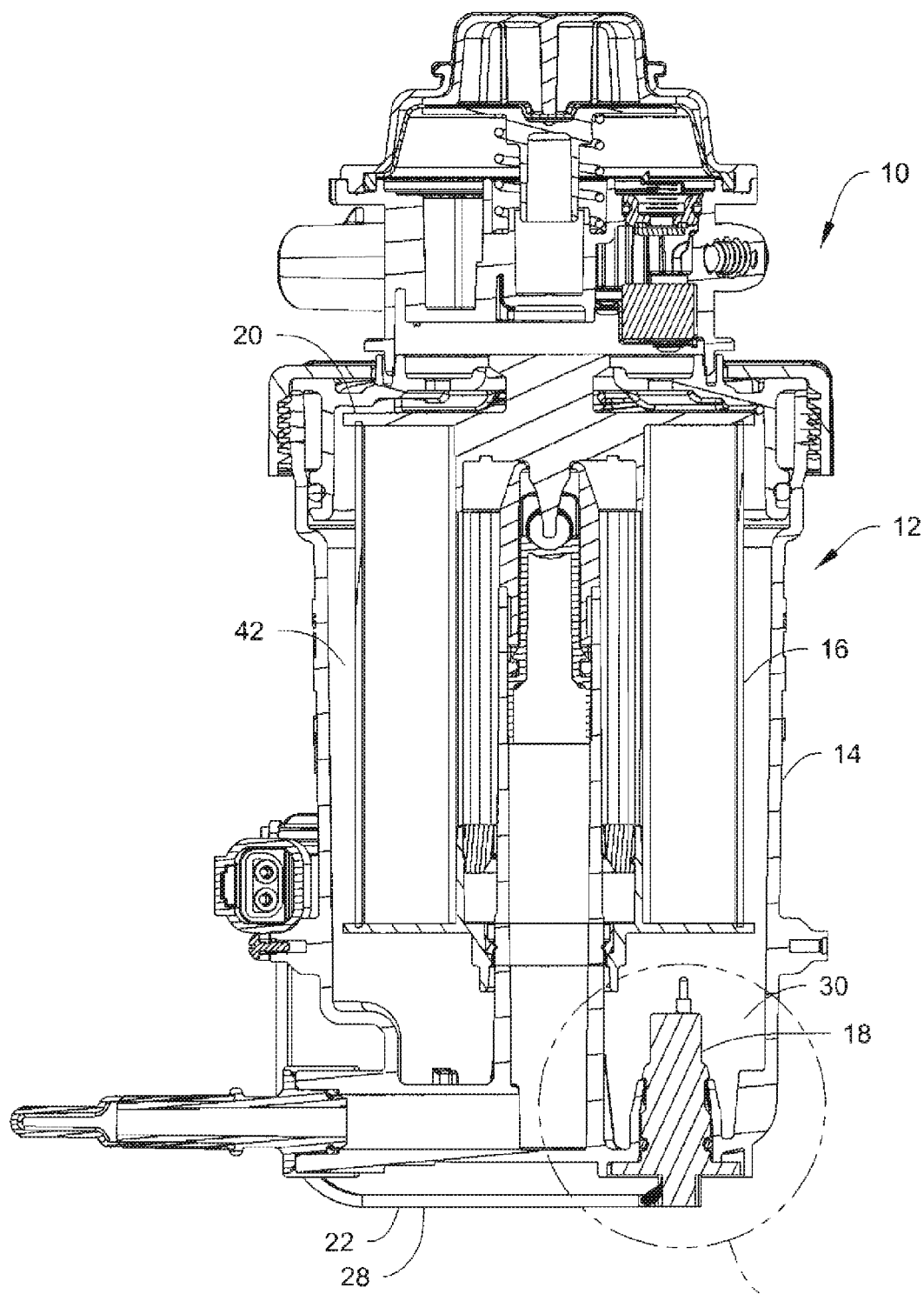
FIG. 1A is a cross-sectional illustration of a filter assembly with a water sensor mounted at a base portion of a filter housing.

In the following detailed description, reference is made to the accompanying drawings which form a part thereof, and in which is shown by way of illustration specific embodiments in which the inventive concepts may be practiced. These embodiments are described in sufficient detail to enable those skilled in the art to practice the invention, and it is to be understood that the embodiments may be combined or used separately, or that other embodiments may be utilized and that structural and procedural changes may be made without departing from the spirit and scope of the inventive concepts. The following detailed description provides examples, and the scope of the present invention is defined by the claims to be added and their equivalents.

An improved water sensor and method for retaining a water sensor to a filter housing are described herein. A snap-fit connection is utilized to secure the water sensor to the filter housing. The water sensor and method will be described in an application involving retaining a water-in-fuel sensor to a fuel filter housing of a water separating fuel filter assembly. However, it is to be understood that the use of the snap-fit connection described herein is not limited to connecting a water-in-fuel sensor to a fuel filter housing. The snap-fit connection can be used to connect a water sensor to a filter housing in other engine fluid filtration systems.

As shown in FIG. 1, one embodiment of the present filter assembly with snap-in water sensor is in the form of a water separating fuel filter assembly 10 adapted for removing undesirable contaminants from fuel and for separating water from the fuel. The filter assembly 10 includes a filter housing 12 having a side wall 14, a base portion 28 defining a closed end 22, an open end 20, and an interior space 42 defined by the side wall 14 and the base portion 28. The filter assembly 12 also includes a water separating filter cartridge 16 disposed in the interior space 42 and a collection sump area 30 where the separated water is collected.

With reference to FIGS. 1A, 1B, 2A and 2B, an opening 26 is defined in the base portion 28 of the housing 12 in the vicinity of the collection sump area 30, where a mounting receptacle 34 is formed that extends upward from the opening 26 into the interior space 42 of the housing 12 for receiving a water sensor 18. In the embodiment as shown in FIGS. 1 and 2, the opening 26 is defined in the base portion 28 of the housing 12 and in turn, the embodiment as shown in FIGS. 1 and 2 can be called a base-mounted configuration. It is to be understood that the opening 26 and mounting receptacle 34 can also be formed in the side wall 14 of the housing 12, which would be called a side-mounted configuration, as long as the subsequently mounted sensor can sense a level of water collected in the sump area 30.

Figure 1B:
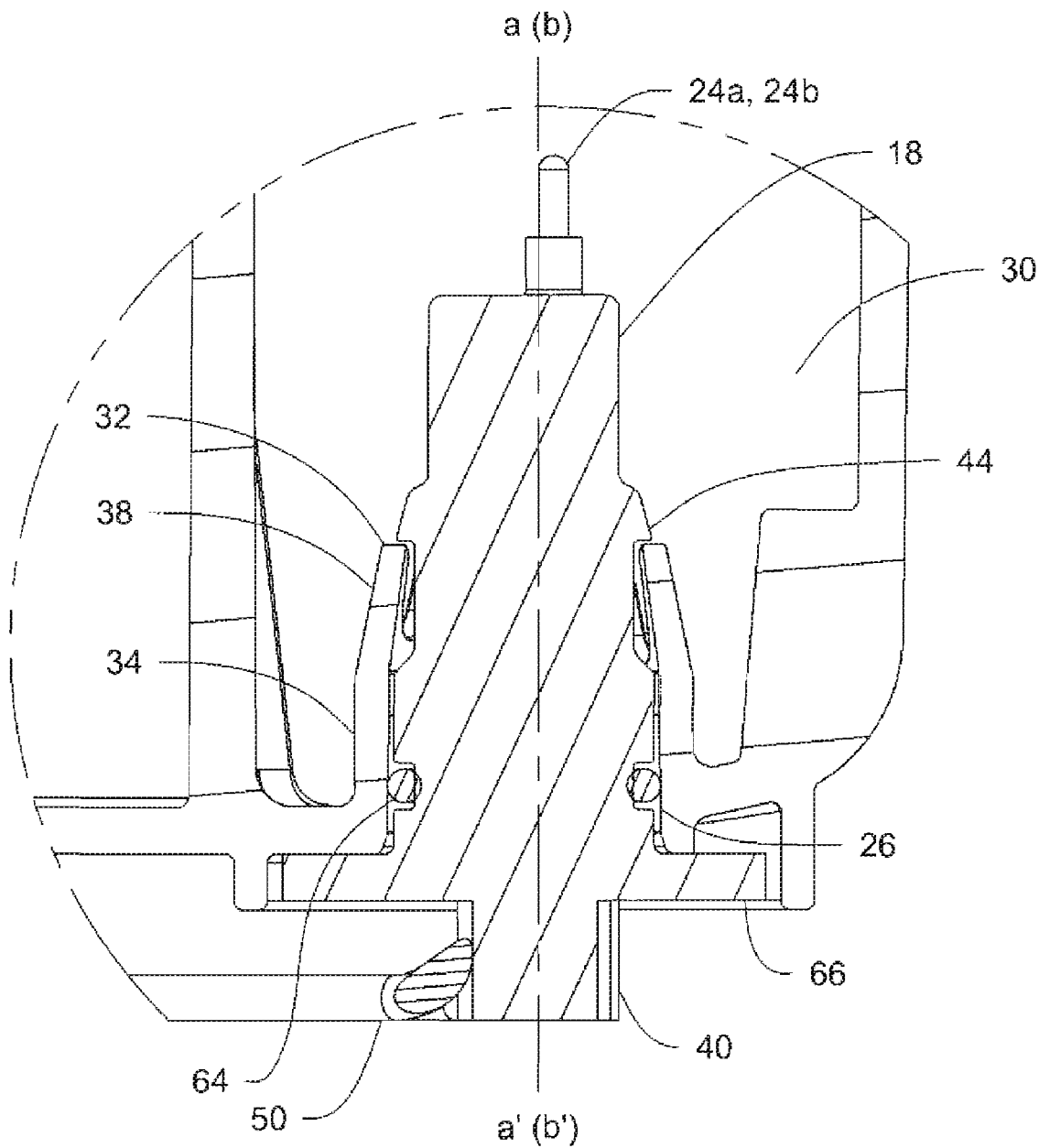
FIG. 1B is an enlarged view of the portion in the circle in FIG. 1A.
Figure 2A:
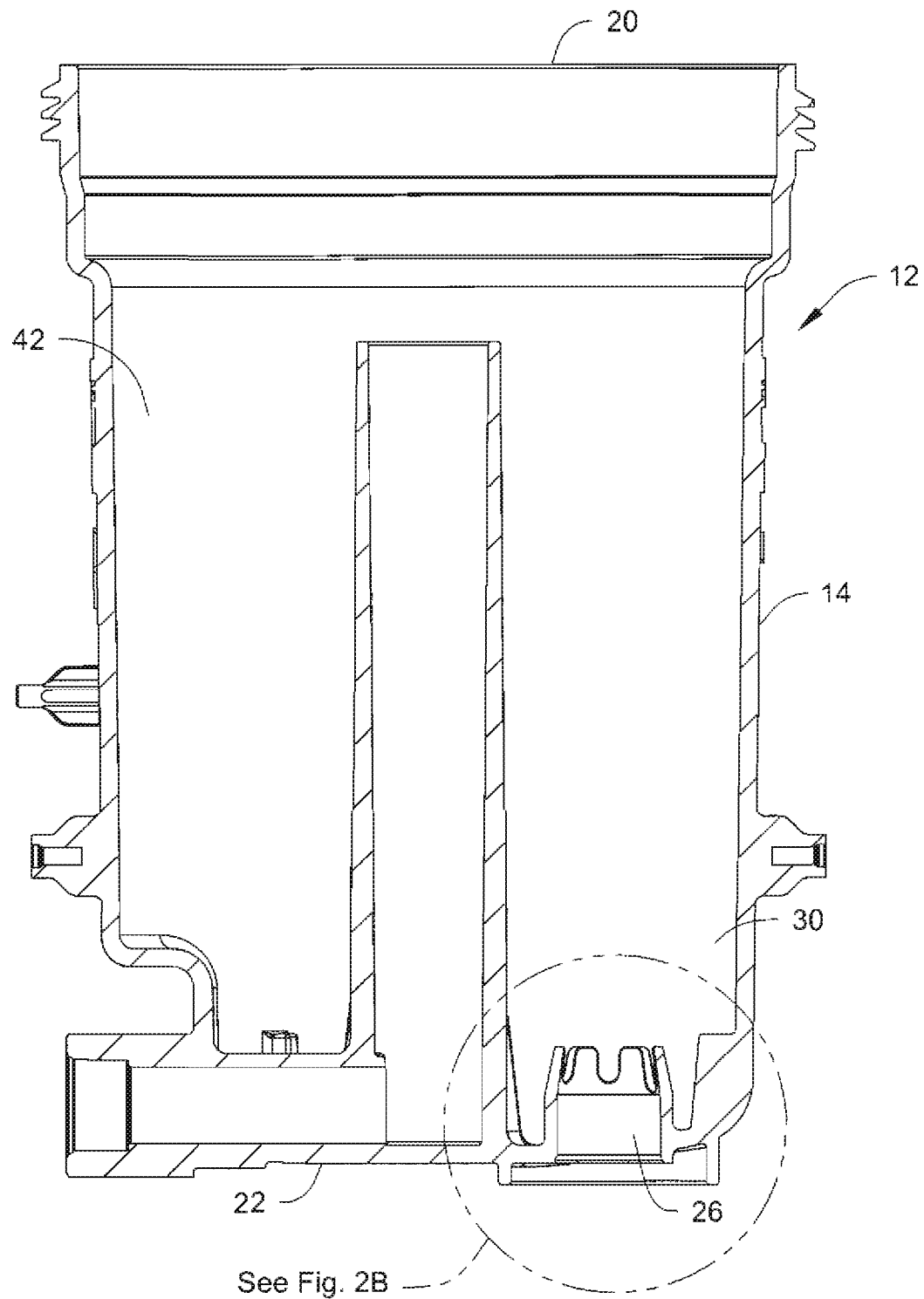
FIG. 2A is a cross-sectional illustration of the filter housing including a first snap-fit connection member.
Figure 2B:
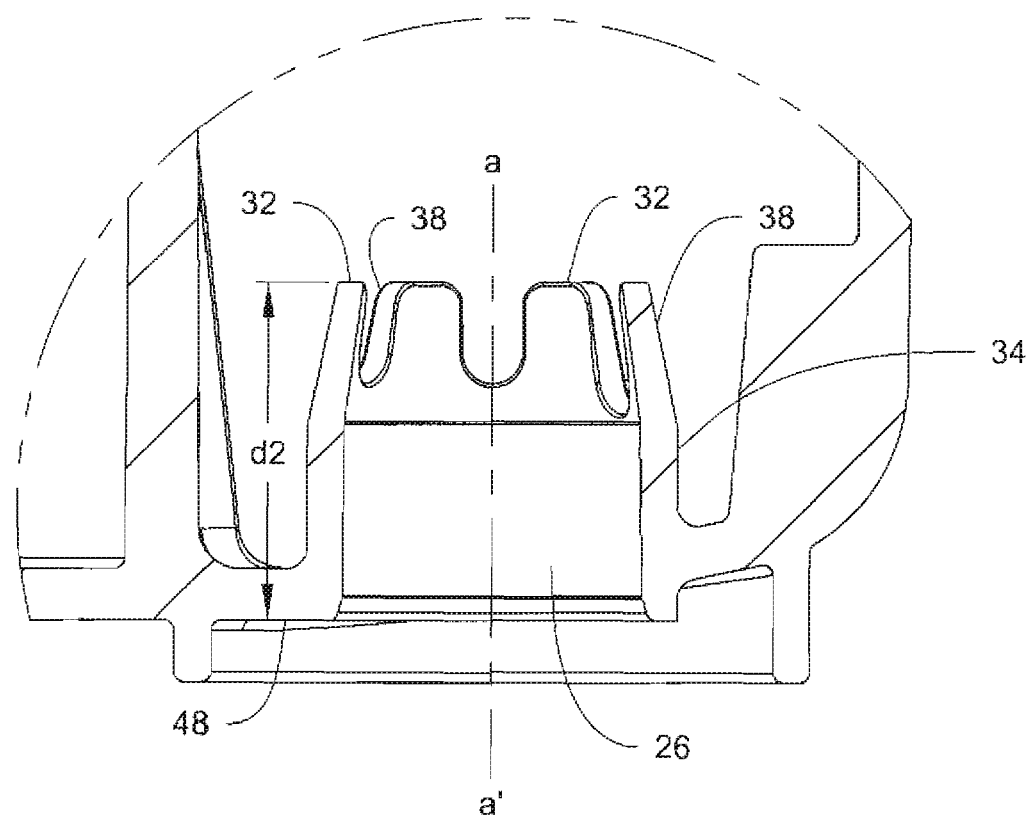
FIG. 2B is an enlarged view of the portion in the circle in FIG. 2A.

A first snap-fit connection member is formed on the mounting receptacle 34. As best shown in FIGS. 1B and 2B, the first snap-fit connection member is in the form of a plurality of, for example six, circumferentially spaced upwardly extending snap-fit fingers 38, which are provided at the upper end of the mounting receptacle 34 and are of a substantially identical size and shape. Each of the fingers 38 is slightly tapered at the tip 32, which helps control the insertion force necessary to install the water sensor 18, and are angled inwardly toward a longitudinal axis a-a' of the mounting receptacle 34. The mounting receptacle 34 and the snap-fit fingers define a passageway through which the water sensor 18 is inserted.

The plurality of fingers can be symmetrically or asymmetrically spaced from one another by slots, and a different numbers of fingers can be used, for example three, four, five, seven, etc. The number of slots also helps to control the insertion force necessary to insert the water sensor 18 into the mounting receptacle 34. The snap-fit fingers are made of a material that provides sufficient resilience such that the fingers can flex backward (i.e. away from the axis a-a') when a predetermined force is applied to them and return back to their original undeflected position (shown in FIG. 2B) when the force is removed. The mounting receptacle 34 and snap-fit fingers 38 can be metal, or made of a non-metallic material, for example a plastic or composite material.

Figure 3:
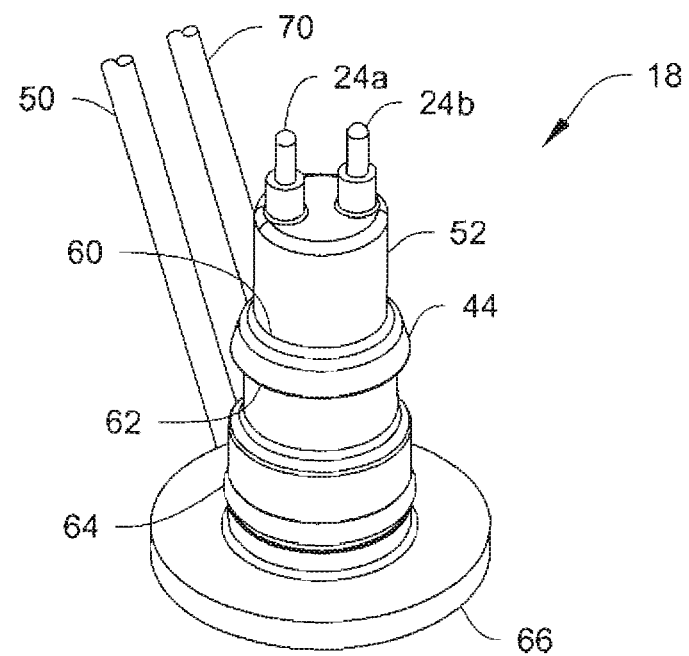
FIG. 3 is a perspective view of the water sensor.
Figure 4:
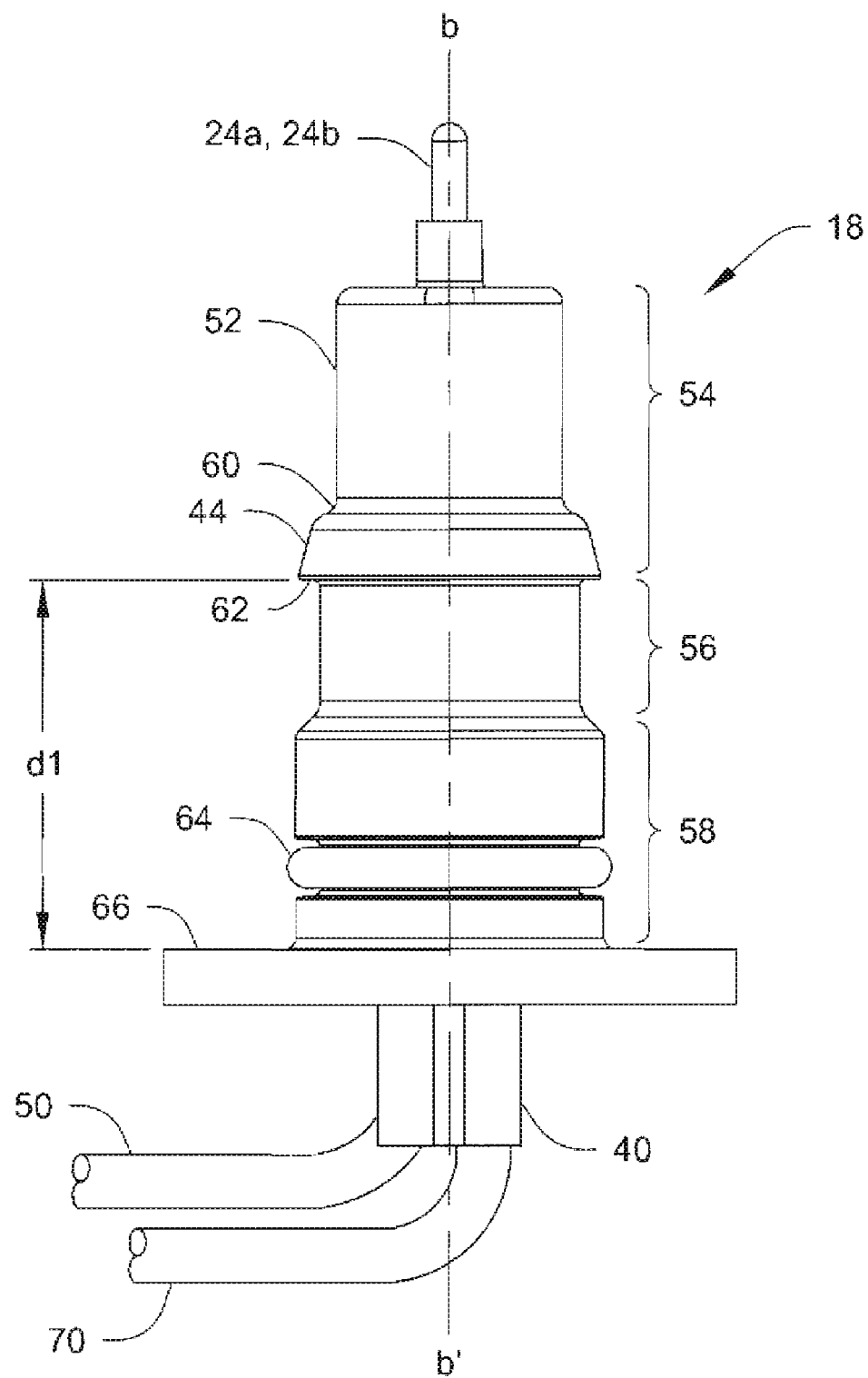
FIG. 4 is a side view of the water sensor depicted in FIG. 3.

Details of the water sensor 18 are illustrated in FIGS. 3 and 4. The water sensor 18 is a snap-in water-in-fuel (WIF) sensor designed to mount to the housing 12 as illustrated. The WIF sensor 18 includes a generally cylindrical sensor body 52 having an upper portion 54, a neck portion 56, a lower portion 58, and a longitudinal axis b-b'. The WIF sensor 18 also includes a pair of spaced-apart sensing probes 24a, 24b arranged side-by-side and extending upward from the upper surface of the upper portion 54.

The WIF sensor 18 also includes a second snap-fit connection member for engagement with the first snap-fit connection member of the mounting receptacle 34 to form a snap-fit connection. With specific reference to FIGS. 3 and 4, the second snap-fit connection member is in the form of a retention ring 44 extending circumferentially around the upper portion 54. The ring 44 is configured such that it has an increasing outer diameter from its top end 60 to its bottom end 62. The sensor body 52 and the retention ring 44 can be metal, or made of a non-metallic material, for example a plastic or composite material.

The WIF sensor 18 also includes a sealing ring 64 for sealing the interface between the WIF sensor 18 and the inner surface of the mounting receptacle 34. The sealing ring 64 is preferably an elastomeric o-ring seal that is part of and is removable with the WIF sensor 18.

The WIF sensor 18 also includes a stop mechanism 66 for limiting insertion of the WIF sensor 18 into the mounting receptacle 34. As shown in FIGS. 3 and 4, the stop mechanism 66 is in the form of a circular, radially extending flange disposed at the lower end of the lower portion 58. As shown in FIGS. 1A and 1B, the diameter of the flange is larger than the diameter of the mounting receptacle 34 so that upon insertion of the WIF sensor 18 into the mounting receptacle 34, the flange abuts against the base portion 28 to limit the extent of insertion of the sensor into the receptacle. Other stop mechanisms could be used as long as they are able to limit the extent of insertion of the sensor into the mounting receptacle.

With reference to FIGS. 2B and 4, the distance "d1" between the upper surface of the stop mechanism 66 and the bottom end 62 of the retention ring 44 is slightly greater than the distance "d2" between a bottom surface 48 of the base portion around the opening 26 and the tips 32 of the snap-fit fingers 38, to accommodate stack-up of tolerances and installation. The difference between "d1" and "d2" is not so great, however, as to permit excessive movement between the sensor 18 and the receptacle 34 that could create an undesirable rattling noise and lead to wear of the sensor 18 or receptacle.

In addition, as is conventional, power and signal lines 50, 70 lead from the WIF sensor to direct power to the sensor, and to lead signals from the sensor to a control unit to be used for signaling a user that excessive water is present in the filter housing when the water reaches the level of the probes 24a, 24b which completes a circuit between the probes.

With reference to FIGS. 1A and 1B, during assembly of the filter housing 12, the WIF sensor 18 is inserted through the opening 26 and into the mounting receptacle 34 of the filter housing 12. As the sensor is being inserted, the retention ring 44 deflects the snap-fit fingers 38 outwardly. When the bottom end 62 of the retention ring 44 has passed the tip 32 of the snap-fit fingers 38, the snap-fit fingers 38 spring inwardly causing the tips 32 of the snap-fit fingers 38 to engage the bottom end 62 of the retention ring 44 to prevent removal of the sensor. In addition, the upper surface 46 of the stop mechanism 66 engages with the base portion to stop the insertion of the water sensor 18 into the mounting receptacle 34. The radial sealing ring 64 provides watertight sealing between the inner surface of the receptacle 34 and around the outer surface of the WIF sensor 18 so that there is no fluid leakage at those interfaces. It should be evident that other means of sealing could be used separately or in combination with the sealing ring, such as an adhesive sealant or an integral sealing flange. In addition, the upper surface of the stop mechanism 66 engages against the bottom surface of the base portion 28 to help provide additional sealing.

Figure 5:
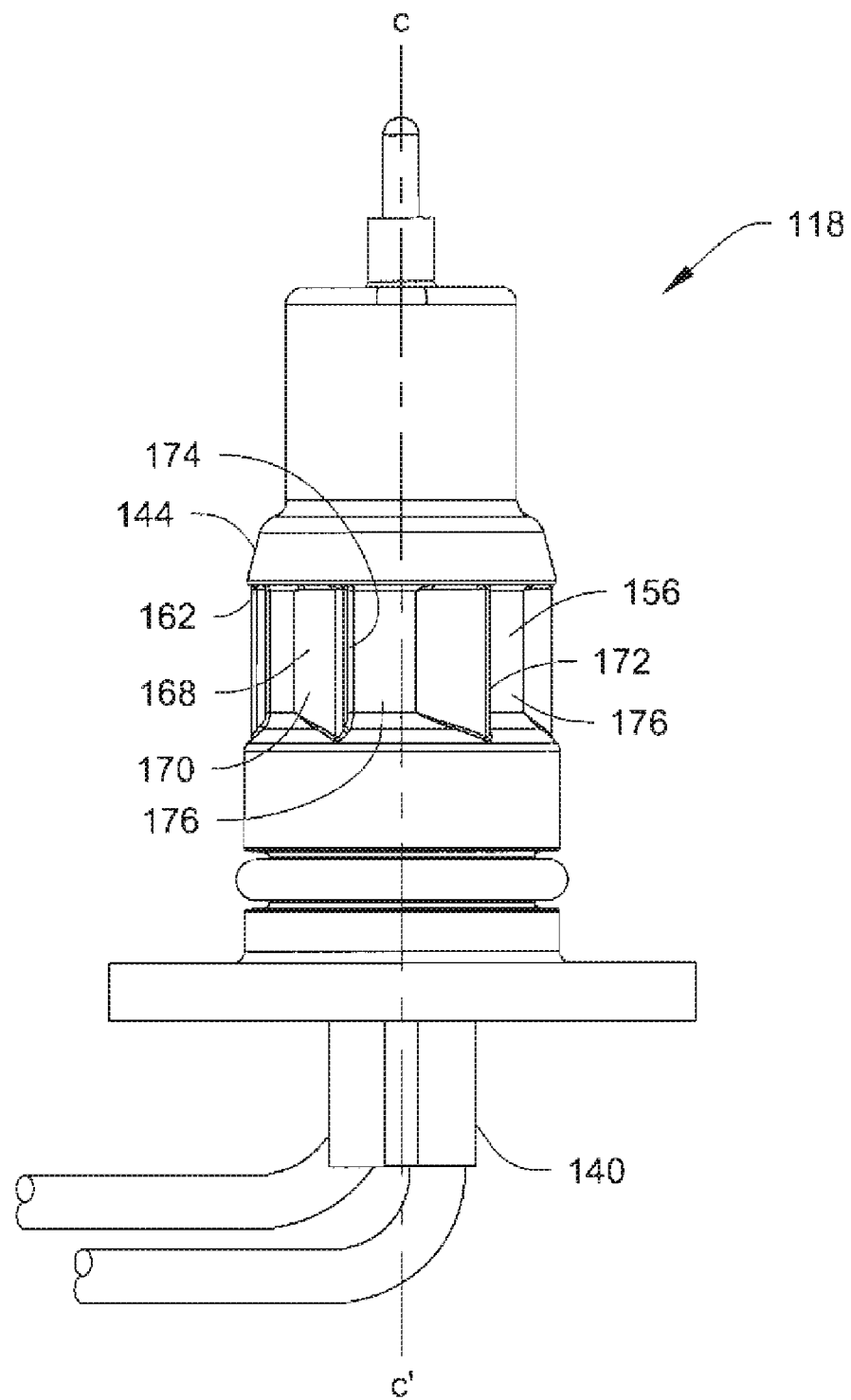
FIG. 5 is a side view of another embodiment of a water sensor including a snap-fit connection releasing mechanism.

FIG. 5 illustrates an embodiment of a WIF sensor 118 that includes a snap-fit connection releasing mechanism for releasing the snap-fit connection. This permits removal of a faulty or defective WIF sensor 118 with a new WIF sensor. The sensor releasing mechanism is in the form of a plurality of inclined ramps 168 projecting from a neck portion 156 of the sensor 118. Each ramp 168 includes a sloped actuating face 170, a radial face 174 and a distal end 172. Gaps 176 are defined between adjacent ramps 168. The number of gaps 176 preferably corresponds to the number of snap-fit fingers on the mounting receptacle, with the gaps sized to receive the snap-fit fingers therein. An actuating member 140, for example a protrusion, is provided at the base of the sensor 118 for engagement by a tool, for example a screwdriver, to apply a rotational force to the sensor 118 so as to rotate the sensor.

The sensor 118 is preferably installed in the mounting receptacle such that the snap-fit fingers on the receptacle are disposed in the gaps 176 between the ramps 168. Thus, the sensor 118 is retained in position in the same manner as the sensor 18. However, the sensor 118 can be removed by rotating the sensor 118 and pulling the sensor out of the receptacle. In particular, rotating the sensor 118 in a suitable direction causes the actuating faces 170 to engage the snap-fit fingers. This engagement forces the fingers outwardly to allow the retention ring 144 to clear the tips of the snap-fit fingers to enable the sensor to be pulled out of the filter housing.

It is to be understood that, although the mounting receptacle and the WIF sensor are illustrated and described as being generally cylindrical in shape, other shapes can be used, such as elliptical, square or polygonal.

It is to be understood that the snap-fit connection can be reversed, where the snap-fit fingers are provided on the water sensor and the retention ring provided on the mounting receptacle.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A filter assembly, comprising:
    a plastic filter housing including a wall defining an interior space and a water sump to collect water, a sensor mounting receptacle formed in the filter housing adjacent the water sump and a first plastic snap-fit connection member formed on the sensor mounting receptacle;
    a filter disposable within the interior space of the filter housing, the filter designed to separate water from a fluid to be filtered by the filter; and
    a water sensor mounted within the sensor mounting receptacle and at least partially extending into the water sump; the water sensor having a generally cylindrical sensor body with an upper portion, a lower portion, and a neck portion between the upper portion and the lower portion, a second snap-fit connection member on the upper portion that engages the first snap-fit connection member to secure the water sensor to the filter housing, a stop mechanism connected to the lower portion to limit insertion of the water sensor into the sensor mounting receptacle, and an elastomeric radial sealing ring extending circumferentially around a radial outer circumference of the lower portion and configured to seal between an outer surface of the water sensor and an inner surface of the sensor mounting receptacle; the elastomeric sealing ring is positioned between the second snap-fit connection member and the stop mechanism.

2. The filter assembly of claim 1, wherein the sensor mounting receptacle projects into the interior space, and the first snap-fit connection member includes a plurality of snap-fit fingers located at an end of the sensor mounting receptacle.

3. The filter assembly of claim 2, wherein the second snap-fit connection member includes a retention ring extending circumferentially around a radial outer circumference of the upper portion and has an increasing outer diameter from a top end to a bottom end, the retention ring is configured to deflect and pass the snap-fit fingers, and tips of the snap-fit fingers engage the bottom end of the retention ring.

4. The filter assembly of claim 1, wherein the water sensor further includes a snap-fit connection releasing mechanism that is configured to engage with the first plastic snap-fit connection member to release the snap-fit connection between the first plastic snap-fit connection member and the second snap fit connection member.

5. The filter assembly of claim 4, wherein the snap-fit connection releasing mechanism includes a plurality of ramps disposed on and projecting radially outward from the neck portion.

6. The filter assembly of claim 1, wherein the stop mechanism comprises a flange that has a dimension larger than a dimension of the sensor mounting receptacle.

7. The filter assembly of claim 1, the second snap-fit connection member is made of plastic.

8. A water sensor, comprising:
    a generally cylindrical sensor body with an upper portion, a lower portion, and a neck portion between the upper portion and the lower portion;
    a pair of spaced-apart water sensing probes connected to the upper portion and extending in a direction away from the lower portion;
    a snap-fit connection member on the upper portion adapted for use in a snap-fit connection;
    an insertion stop mechanism formed on the lower portion; and
    an elastomeric radial sealing ring disposed on and extending circumferentially around a radial outer circumference of the lower portion, the elastomeric sealing ring is positioned between the snap-fit connection member and the insertion stop mechanism.

9. The water sensor of claim 8, wherein the snap-fit connection member includes a retention ring extending circumferentially around a radial outer circumference of the upper portion and has an increasing outer diameter from a top end to a bottom end thereof.

10. The water sensor of claim 9, where the sensor body further includes a plurality of connection release ramps formed on and projecting radially outward from the neck portion adjacent to the retention ring.

11. The water sensor of claim 10, further comprising an actuating member connected to the insertion stop mechanism to allow a rotational force to be applied to the sensor body.

* * * * *